United States Patent
Guo et al.

(10) Patent No.: US 12,493,086 B2
(45) Date of Patent: Dec. 9, 2025

(54) METHOD AND SYSTEM FOR ASSESSING SLIDING ELECTRICAL CONTACT PERFORMANCE OF ELECTRIC LOCOMOTIVE PANTOGRAPH-CATENARY SYSTEM

(71) Applicant: Wenzhou University, Wenzhou (CN)

(72) Inventors: Fengyi Guo, Wenzhou (CN); Xili Wang, Wenzhou (CN); Zhiyong Wang, Wenzhou (CN); Zhonghua Chen, Wenzhou (CN)

(73) Assignee: WENZHOU UNIVERSITY, Wenzhou (CN)

( * ) Notice: Subject to any disclaimer, the term of this patent is extended or adjusted under 35 U.S.C. 154(b) by 188 days.

(21) Appl. No.: 18/482,032

(22) Filed: Oct. 6, 2023

(65) Prior Publication Data
US 2024/0272241 A1     Aug. 15, 2024

(30) Foreign Application Priority Data
Feb. 15, 2023    (CN) .......................... 202310116980.0

(51) Int. Cl.
*G01R 31/66*    (2020.01)
*B60L 3/12*    (2006.01)

(52) U.S. Cl.
CPC ................ *G01R 31/66* (2020.01); *B60L 3/12* (2013.01); *B60L 2200/30* (2013.01)

(58) Field of Classification Search
CPC ....... H01H 31/36; B60M 1/23; G01R 31/025; G01R 31/66; G01R 31/00; B60L 3/0023; B60L 5/24; B60L 3/12; B60W 10/04

USPC .......................................... 324/217
See application file for complete search history.

(56) References Cited

U.S. PATENT DOCUMENTS

| | | | | |
|---|---|---|---|---|
| 3,997,822 A | * | 12/1976 | Logston, Jr. ............... | B60L 3/10 318/52 |
| 4,041,470 A | * | 8/1977 | Slane ................... | B61L 15/0036 340/505 |
| 2013/0082626 A1 | * | 4/2013 | Daigle .................... | B60L 50/13 318/52 |
| 2016/0096540 A1 | * | 4/2016 | Cipollone ............. | B61L 25/021 701/19 |

* cited by examiner

*Primary Examiner* — Roberto Velez
(74) *Attorney, Agent, or Firm* — Leong C. Lei

(57) ABSTRACT

A method for assessing sliding electrical contact performance of an electric locomotive pantograph-catenary system includes determining a current manifestation of a catenary-following ability of a pantograph to a catenary of the pantograph-catenary system, wherein the current manifestation is one or more of a pressure difference, a time delay, and a curve difference; and performing comparison between a fluctuating pressure curve related to a fluctuating pressure of the catenary and a catenary-following pressure curve related to a catenary-following pressure of the pantograph over time under the current manifestation, and rating the catenary-following ability of the pantograph under the current manifestation according to a result of the comparison. By implementing the method, precise assessment of the sliding electrical contact performance can be achieved.

10 Claims, 3 Drawing Sheets

METHOD AND SYSTEM FOR ASSESSING SLIDING ELECTRICAL CONTACT PERFORMANCE OF ELECTRIC LOCOMOTIVE PANTOGRAPH-CATENARY SYSTEM

BACKGROUND OF THE INVENTION

1. Technical Field

The present invention relates to electric locomotives running on electrified railways, and more particularly to a method and a system for assessing sliding electrical contact performance of an electric locomotive pantograph-catenary system.

2. Description of Related Art

A high-speed rail train gets a traction current through the sliding electrical contact between a pantograph and a catenary that form a pantograph-catenary system. When the electric locomotive operates, stable high-speed current collection only happens when the pantograph-catenary system maintains good contact. However, during the high-speed movement of the train, the contact wire, under the excitation form the pantograph, incurs vibration in the catenary system. Increased vibration will lead to pantograph-catenary off-line arcs, which can qualitatively degrade current collection and even damage insulated wires to make the train lose power, traction, and braking force in the worst-case scenario. While an increased contact pressure can effectively reduce pantograph-catenary off-line arcs, it leads to aggravated mechanical wear on the contact wire and the pan, which means decreased service lives of and increased maintained costs for these components. In an experiment conducted in a French TGV high-speed train, when the train ran at 200 km/h, pantograph-catenary off-line arcs happened sometimes. When the train ran at 300 km/h, pantograph-catenary off-line arcs happened frequently and the catenary vibrated seriously. When the train ran at 574.8 km/h, the pantograph and the catenary were in an arcing situation where they were not in normal contact at all.

In China, the Sichuan-Tibet Railway travels along a special route characterized by higher altitudes, high ratios of bridge-tunnel sections, high temperature variation, and super long ramps, which represent an environment having adverse effects on current collection in the pantograph-catenary system. To be specific, thermal stress changes of the pantograph-catenary system caused by extreme coldness and high temperature variation can cause and abnormal aerodynamic fluctuation happening at low air pressures can degrade sliding electrical contact performance of the pantograph-catenary system.

Currently, researches are mainly focused on two points. The first is to make improvements between pantograph pans and contact wires in terms of structure and material, thereby enhancing current collection of electric locomotives. Nevertheless, the achieved improvements only provide limited effects. The second is based on active control and involves feedback control of pantographs, yet there are many fundamental issues to address. Therefore, assessment of sliding electrical contact performance of an electric locomotive pantograph-catenary system is desirable.

The existing methods for assessing electric locomotive pantograph-catenary system sliding electrical contact performance, however, are less precise because of their single assessment objects and simple approaches. Hence, there is a need for an improved, high precision method for assessing sliding electrical contact performance of an electric locomotive pantograph-catenary system, which is useful in improving the pantograph-catenary system by optimizing current collection stability and wear control and in turn extending the service life of the pantograph-catenary system.

SUMMARY OF THE INVENTION

The technical issue to be addressed by embodiments of the present invention is to provide a method and a system for assessing sliding electrical contact performance of an electric locomotive pantograph-catenary system, so as to address the defects about low precision as seen in the existing assessment methods, thereby improving the pantograph-catenary system, optimizing the current collection stability and wear control during the sliding electrical contact of the pantograph-catenary system, and extending the service life of the pantograph-catenary system according to the assessment result.

To address the foregoing technical issue, one embodiment of the present invention provides a method for assessing sliding electrical contact performance of an electric locomotive pantograph-catenary system. The method comprises the following steps:

determining a current manifestation of a catenary-following ability of a pantograph to a catenary of the pantograph-catenary system, wherein the current manifestation is one or more of a pressure difference, a time delay, and a curve difference; and performing comparison between a fluctuating pressure curve related to a fluctuating pressure of the catenary and a catenary-following pressure curve related to a catenary-following pressure of the pantograph over time under the current manifestation, and rating the catenary-following ability of the pantograph under the current manifestation according to a result of the comparison.

Therein, the step of performing comparison between a fluctuating pressure curve related to a fluctuating pressure of the catenary and a catenary-following pressure curve related to a catenary-following pressure of the pantograph over time under the current manifestation, and rating the catenary-following ability of the pantograph under the current manifestation according to a result of the comparison comprises:

acquiring the fluctuating pressure curve of the catenary and the catenary-following pressure curve of the pantograph over time under the current manifestation;

setting a plurality of sampling time points, and performing data collection on both of the fluctuating pressure curve of the catenary and the catenary-following pressure curve of the pantograph under the current manifestation according to the sampling time points, so as to collect a fluctuating pressure value of the catenary and a catenary-following pressure value of the pantograph corresponding to each of the sampling time points under the current manifestation;

using $$f = \frac{F_l - F_p}{F_l}$$

to calculate a catenary-following factor f formed by the fluctuating pressure and the catenary-following pressure at each of the sampling time points under the current manifestation, where $F_l$ and $F_p$ represent the fluctuating pressure value and the catenary-following pressure value corresponding to the same sampling time point under the same manifestation, respectively; and according to the fluctuating pressure value and the catenary-following pressure value corresponding to each of the sampling time points under the current manifestation in combination with the calculated catenary-following factor f related to each of the sampling time points under the current manifestation, rating the pantograph catenary-following ability corresponding to each of the sampling time points under the current manifestation.

Therein, the step of according to the fluctuating pressure value and the catenary-following pressure value corresponding to each of the sampling time points under the current manifestation in combination with the calculated catenary-following factor f related to each of the sampling time points under the current manifestation, rating the pantograph catenary-following ability corresponding to each of the sampling time points under the current manifestation comprises:

under the current manifestation, acquiring the fluctuating pressure value $F_l$ and the catenary-following pressure value $F_p$ corresponding to each of the sampling time points, respectively, as well as the catenary-following factor f calculated from the two values;

if the catenary-following factor corresponding to a certain one of the sampling time points f<0 and the acquired catenary-following pressure value $F_p$>the acquired fluctuating pressure value $F_l$, determining that the catenary-following pressure value of the pantograph corresponding to the certain sampling time point is large and tends to accelerate wear of a pantograph pan of the pantograph;

if the catenary-following factor corresponding to a certain one of the sampling time points f=0 and the acquired catenary-following pressure value $F_p$=the acquired fluctuating pressure value $F_l$, determining that the catenary-following ability is optimal and matching of the pantograph-catenary system is optimal at the certain sampling time point;

if the catenary-following factor corresponding to a certain one of the sampling time points f>0 and the acquired catenary-following pressure value $F_p$<the acquired fluctuating pressure value $F_l$, determining that the catenary-following pressure value of the pantograph corresponding to the certain sampling time point is small and tends to incur separation and arcs between the pantograph and the catenary; and if the catenary-following factor corresponding to a certain one of the sampling time points f<0 and the acquired catenary-following pressure value $F_p$ is greater than the acquired fluctuating pressure value $F_l$ by more than a predetermined threshold value, or if the catenary-following factor corresponding to a certain one of the sampling time points f>0 and the acquired catenary-following pressure value $F_p$ is smaller than the acquired fluctuating pressure value $F_l$ by more than a predetermined threshold value, determining that the catenary-following ability at that sampling time point is poor.

Therein, the pressure values on the catenary-following pressure curve of the pantograph are acquired by building up a dynamic equation of the pantograph, and the pressure values on the fluctuating pressure curve of the catenary are acquired by building up a dynamic equation of the catenary.

Therein, the pressure difference is determined by the catenary-following pressure of the pantograph, and the time delay is determined by a control delay of the pantograph, while the curve difference is determined by external interfering factors acting on the pantograph.

An embodiment of the present invention further provides a system for assessing sliding electrical contact performance of an electric locomotive pantograph-catenary system. The system comprises:

a catenary-following ability manifestation determining unit, for determining a current manifestation of a catenary-following ability of a pantograph to a catenary of the pantograph-catenary system, wherein the current manifestation is one or more of a pressure difference, a time delay, and a curve difference; and a catenary-following ability assessing unit, for performing comparison between a fluctuating pressure curve related to a fluctuating pressure of the catenary and a catenary-following pressure curve related to a catenary-following pressure of the pantograph over time under the current manifestation, and rating the catenary-following ability of the pantograph under the current manifestation according to a result of the comparison.

Therein, the catenary-following ability assessing unit comprises:

a curve-acquiring module, for acquiring the fluctuating pressure curve of the catenary and the catenary-following pressure curve of the pantograph over time under the current manifestation;

a data-collecting module, for setting a plurality of sampling time points, and performing data collection on both of the fluctuating pressure curve of the catenary and the catenary-following pressure curve of the pantograph under the current manifestation according to the sampling time points, so as to collect a fluctuating pressure value of the catenary and a catenary-following pressure value of the pantograph corresponding to each of the sampling time points under the current manifestation;

a factor-calculating module, for using $$f = \frac{F_l - F_p}{F_l}$$

to calculate a catenary-following factor f formed by the fluctuating pressure and the catenary-following pressure at each of the sampling time points under the current manifestation, where $F_l$ and $F_p$ represent the fluctuating pressure value and the catenary-following pressure value corresponding to the same sampling time point under the same manifestation, respectively; and a performance-assessing module, for according to the fluctuating pressure value and the catenary-following pressure value corresponding to each of the sampling time points under the current manifestation in combination with the calculated catenary-following factor f related to each of the sampling time points under the current manifestation, rating the pantograph catenary-following ability corresponding to each of the sampling time points under the current manifestation.

Therein, the performance-assessing module comprises:

a parameter acquiring sub-module, for under a certain manifestation, acquiring the fluctuating pressure value $F_l$ and the catenary-following pressure value $F_p$ corresponding to each of the sampling time points, respectively, as well as the catenary-following factor f calculated from the two values;

a first assessing sub-module, for if the catenary-following factor corresponding to a certain one of the sampling time points f<0 and the acquired catenary-following pressure value $F_p$>the acquired fluctuating pressure value $F_l$, determining that the catenary-following pressure value of the pantograph corresponding to the certain sampling time point is large and tends to accelerate wear of a pantograph pan of the pantograph;

a second assessing sub-module, for if the catenary-following factor corresponding to a certain one of the sampling time points f=0 and the acquired catenary-following pressure value $F_p$=the acquired fluctuating pressure value $F_l$, determining that the catenary-following ability is optimal and matching of the pantograph-catenary system is optimal at the certain sampling time point;

a third assessing sub-module, for if the catenary-following factor corresponding to a certain one of the sampling time points f>0 and the acquired catenary-following pressure value $F_p$<the acquired fluctuating pressure value $F_l$, determining that the catenary-following pressure value of the pantograph corresponding to the certain sampling time point is small and tends to incur separation and arcs between the pantograph and the catenary; and a fourth assessing sub-module, for if the catenary-following factor corresponding to a certain one of the sampling time points f<0 and the acquired catenary-following pressure value $F_p$ is greater than the acquired fluctuating pressure value $F_l$ by more than a predetermined threshold value, or if the catenary-following factor corresponding to a certain one of the sampling time points f>0 and the acquired catenary-following pressure value $F_p$ is smaller than the acquired fluctuating pressure value $F_l$ by more than a predetermined threshold value, determining that the catenary-following ability at that sampling time point is poor.

Therein, the pressure values on the catenary-following pressure curve of the pantograph are acquired by building up a dynamic equation of the pantograph, and the pressure values on the fluctuating pressure curve of the catenary are acquired by building up a dynamic equation of the catenary.

Therein, the pressure difference is determined by the catenary-following pressure of the pantograph, and the time delay is determined by a control delay of the pantograph, while the curve difference is determined by external interfering factors acting on the pantograph.

By implementing embodiments of the present invention, the following benefits can be achieved.

The present invention uses catenary-following ability as a real-time indicator of sliding electrical contact of an electric locomotive pantograph-catenary system, and improves catenary-following ability of the pantograph by adjusting the catenary-following pressure and adapting to the fluctuating pressure of the contact wire in a real-time manner, so as to address the defects about low precision as seen in the existing assessment methods, and significantly reduce wear and arc erosion occurring in the pantograph-catenary sliding friction pair, thereby improving the pantograph-catenary system in terms of contact loss rate and arcing rate, optimizing the current collection stability and wear control during the sliding electrical contact of the pantograph-catenary system, and in turn extending the service life of the pantograph-catenary system.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
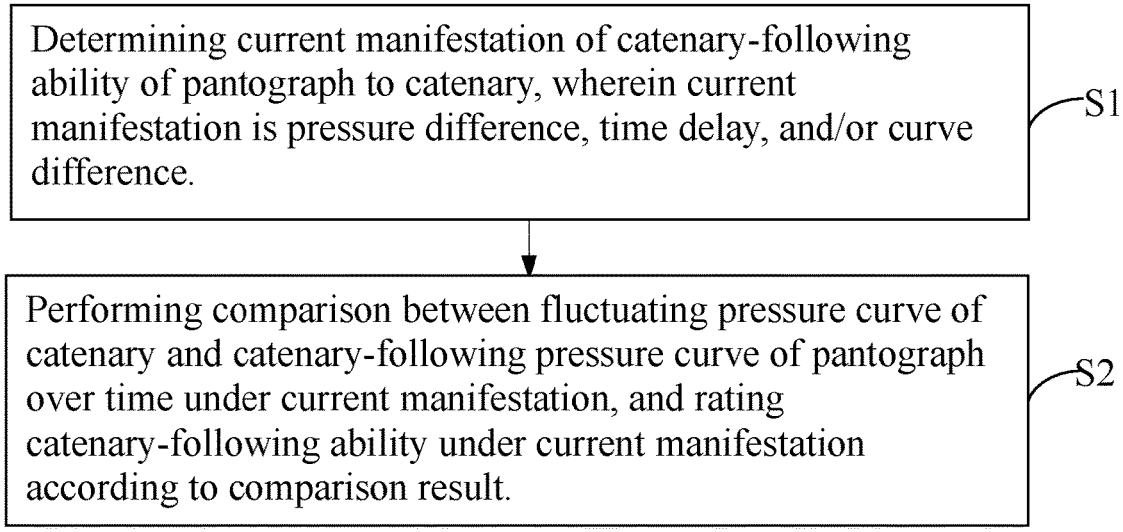
FIG. 1 is a flowchart of a method for assessing sliding electrical contact performance of an electric locomotive pantograph-catenary system according to one embodiment of the present invention.

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

The inventors found that since a catenary is flexible and subject to fluctuations of a certain frequency under the influence of the travelling speed, the ambient conditions, and disturbance acting on pantograph-catenary contact. These fluctuations include transverse waves and vertical waves. Vertical fluctuations can change the contact pressure between the pantograph pan and the catenary wire, and the pantograph uses compression of springs and elasticoplastic deformation of the material forming the pantograph pan to compensate the pressure changes, thereby minimizing variation of the contact pressure. Such a compensative pressure generated by the pantograph to compensate changes in the contact pressure caused by catenary fluctuations is referred to as a catenary-following pressure, whose size and direction vary dynamically.

Based on the catenary-following pressure as described previously, the concept of catenary-following ability can be established and assessed according to how well the pantograph adapts itself to the catenary by adjusting the catenary-following pressure, or, in other words, how well the pantograph makes the pressure it acts on the contact wire in accordance with the variation of the fluctuating pressure of the flexible catenary.

Currently, the foregoing catenary-following ability manifests in the following three forms:
a. Pressure difference: it is normal that the pressure difference is greater or smaller than the fluctuating pressure amplitude of the contact wire, as long as the difference does not exceed a reasonably determined threshold, and the magnitude of the difference is indicative of how good the catenary-following ability is;
b. Time delay (phase-based): the catenary-following pressure applied by the pantograph usually has a delay with respect to the occurrence of the pressure fluctuation of the contact wire, and the magnitude of the delay or the size of the phase is indicative of how good the catenary-following ability is; and
c. Curve difference: due to the complexity of the force-bearing behavior of the pantograph-catenary system, the real-time catenary-following pressure characteristic curve of the pantograph and the fluctuating pressure characteristic curve of the contact wire may be different in terms of wave form, and the magnitude of the difference is indicative of how good the catenary-following ability is.

Thus, based on the three manifestations of catenary-following ability as described previously, the inventors propose a novel method for assessing sliding electrical contact performance of an electric locomotive pantograph-catenary system, which provides real-time assessment of sliding electrical contact performance of an electric locomotive pantograph-catenary system and is useful in improving the catenary-following ability of the pantograph by adjusting the catenary-following pressure and adapting the pantograph to the fluctuating pressure of the contact wire in a real-time manner.

In one embodiment of the present invention, as shown in FIG. 1, a method for assessing sliding electrical contact performance of an electric locomotive pantograph-catenary system comprises the following steps:
S1: determining a current manifestation of a catenary-following ability of a pantograph to a catenary of the pantograph-catenary system, wherein the current manifestation is one or more of a pressure difference, a time delay, and a curve difference; and
S2: performing comparison between a fluctuating pressure curve related to a fluctuating pressure of the catenary and a catenary-following pressure curve related to a catenary-following pressure of the pantograph over time under the current manifestation, and rating the catenary-following ability of the pantograph under the current manifestation according to a result of the comparison.

Specifically, the step S1 involves determining a current manifestation of a catenary-following ability of a pantograph to a catenary of the pantograph-catenary system. Therein, the pressure difference is determined by the catenary-following pressure of the pantograph, and the time delay is determined by a pantograph control delay, while the curve difference is determined by external interfering factors acting on the pantograph.

It is to be noted that coexistence of two or all three of the pressure difference, the time delay, and the curve difference is generally caused by inconsistence between the catenary-following pressure and the fluctuating pressure.

In S2, the fluctuating pressure curve of the catenary and the catenary-following pressure curve of the pantograph over time under the current manifestation are first acquired. Therein, the pressure values on the catenary-following pressure curve of the pantograph are acquired by building up a dynamic equation for the pantograph and the pressure values on the fluctuating pressure curve of the catenary are acquired by building up a dynamic equation for the catenary.

Figure 2:
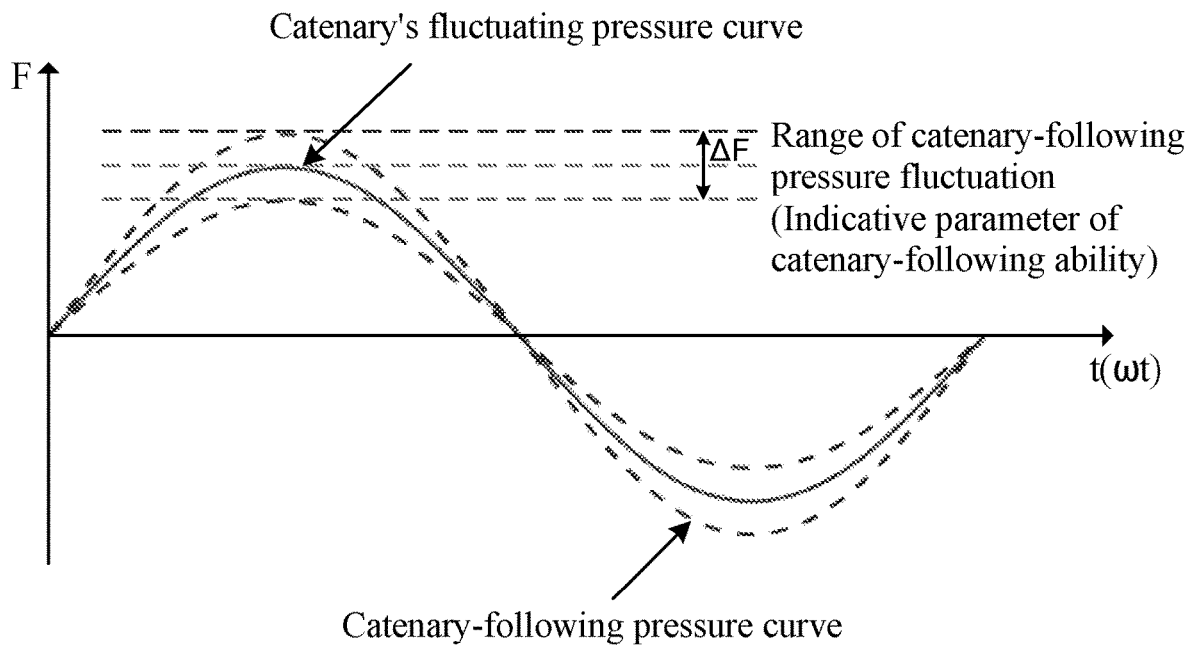
FIG. 2 is a graphic showing comparison between a fluctuating pressure curve related to a fluctuating pressure of the catenary and a catenary-following pressure curve related to a catenary-following pressure of the pantograph over time under the manifestation of the pressure difference in a method for assessing sliding electrical contact performance of an electric locomotive pantograph-catenary system according to an embodiment of the present invention.
Figure 3:
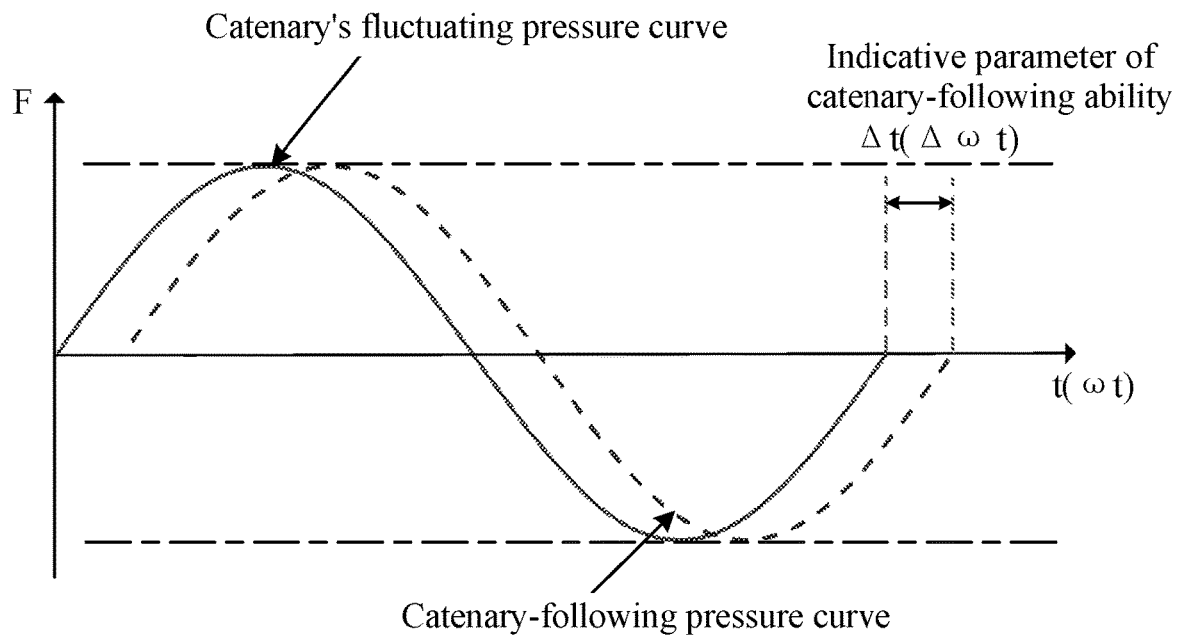
FIG. 3 is a graphic showing comparison between a fluctuating pressure curve related to a fluctuating pressure of the catenary and a catenary-following pressure curve related to a catenary-following pressure of the pantograph over time under the manifestation of the time delay in a method for assessing sliding electrical contact performance of an electric locomotive pantograph-catenary system according to an embodiment of the present invention.
Figure 4:
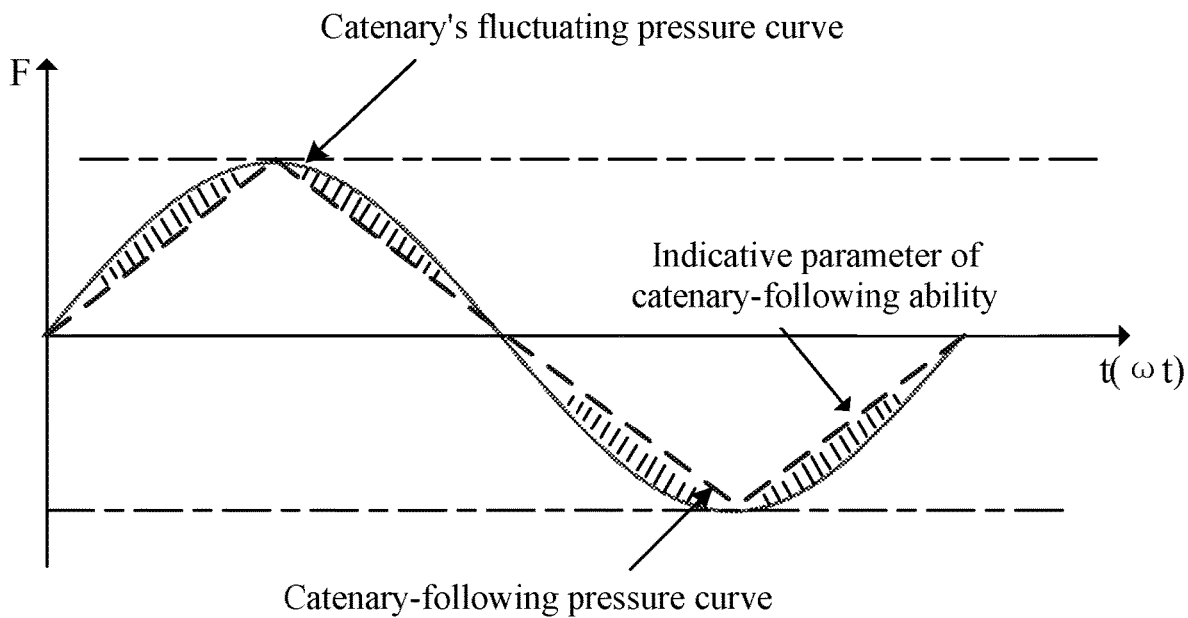
FIG. 4 is a graphic showing comparison between a fluctuating pressure curve related to a fluctuating pressure of the catenary and a catenary-following pressure curve related to a catenary-following pressure of the pantograph over time under the manifestation of the curve difference in a method for assessing sliding electrical contact performance of an electric locomotive pantograph-catenary system according to an embodiment of the present invention.

In an example, under the manifestation of the pressure difference, the fluctuating pressure curve of the catenary (as indicated by the solid line in FIG. 2) and the catenary-following pressure curve of the pantograph (as indicated by the dotted line in FIG. 2) over time are shown in FIG. 2; under the manifestation of the time delay, the fluctuating pressure curve of the catenary (as indicated by the solid line in FIG. 3) and the catenary-following pressure curve of the pantograph (as indicated by the dotted line in FIG. 3) over time are shown in FIG. 3; under the manifestation of the curve difference, the fluctuating pressure curve of the catenary (as indicated by the solid line in FIG. 4) and the catenary-following pressure curve of the pantograph (as indicated by the dotted line in FIG. 4) over time are shown in FIG. 4.

Secondarily, setting a plurality of sampling time points, and performing data collection on both of the fluctuating pressure curve of the catenary and the catenary-following pressure curve of the pantograph under the current manifestation according to the sampling time points, so as to collect a fluctuating pressure value of the catenary and a catenary-following pressure value of the pantograph corresponding to each of the sampling time points under the current manifestation.

Then $$f = \frac{F_l - F_p}{F_l}$$

is used to calculate a catenary-following factor f formed by the fluctuating pressure and the catenary-following pressure at each of the sampling time points under the current manifestation, where $F_l$ and $F_p$ represent the fluctuating pressure value and the catenary-following pressure value corresponding to the same sampling time point under the same manifestation, respectively.

At last, according to the fluctuating pressure value and the catenary-following pressure value corresponding to each of the sampling time points under the current manifestation in combination with the calculated catenary-following factor f related to each of the sampling time points under the current manifestation, the pantograph catenary-following ability corresponding to each of the sampling time points under the current manifestation is rated.

In an example, under the current manifestation, the fluctuating pressure value $F_l$ and the catenary-following pressure value $F_p$ corresponding to each of the sampling time $F_p$ points, respectively, as well as the catenary-following factor f calculated from the two values are acquired.

At this time, if the catenary-following factor corresponding to a certain one of the sampling time points f<0 and the acquired catenary-following pressure value $F_p$>the acquired fluctuating pressure value $F_l$, it is determined that the catenary-following pressure value of the pantograph corresponding to the certain sampling time point is large and tends to accelerate wear of a pantograph pan of the pantograph.

At this time, if the catenary-following factor corresponding to a certain one of the sampling time points f=0 and the acquired catenary-following pressure value $F_p$=the acquired fluctuating pressure value $F_l$, it is determined that the catenary-following ability is optimal and matching of the pantograph-catenary system is optimal at the certain sampling time point.

At this time, if the catenary-following factor corresponding to a certain one of the sampling time points f>0 and the acquired catenary-following pressure value $F_p$<the acquired fluctuating pressure value $F_l$, it is determined that the catenary-following pressure value of the pantograph corresponding to the certain sampling time point is small and tends to incur separation and arcs between the pantograph and the catenary.

At this time, if the catenary-following factor corresponding to a certain one of the sampling time points f<0 and the acquired catenary-following pressure value $F_p$ is greater than the acquired fluctuating pressure value $F_l$ by more than a predetermined threshold value (e.g., $F_p>>F_l$), or if the catenary-following factor corresponding to a certain one of the sampling time points f>0 and the acquired catenary-following pressure value $F_p$ is smaller than the acquired fluctuating pressure value $F_l$ by more than a predetermined threshold value (e.g., $F_p<<F_l$), it is determined that the catenary-following ability at that sampling time point is poor.

Figure 5:
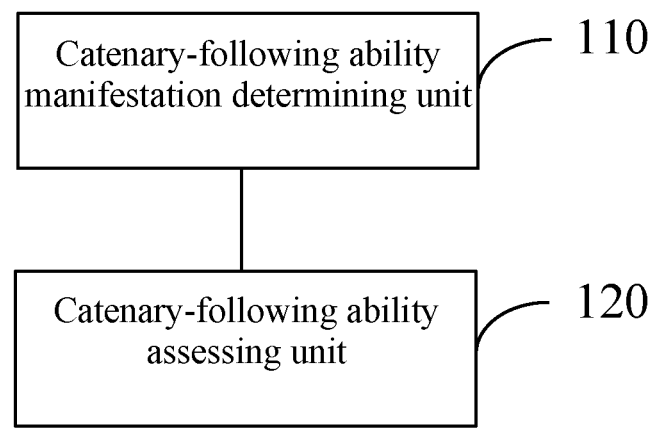
FIG. 5 is a block diagram showing a system for assessing sliding electrical contact performance of an electric locomotive pantograph-catenary system according to an embodiment of the present invention.

As shown in FIG. 5, in an embodiment of the present invention, a system for assessing sliding electrical contact performance of an electric locomotive pantograph-catenary system comprises:
  a catenary-following ability manifestation determining unit 110, for determining a current manifestation of a catenary-following ability of a pantograph to a catenary of the pantograph-catenary system, wherein the current manifestation is one or more of a pressure difference, a time delay, and a curve difference;
  a catenary-following ability assessing unit 120, for performing comparison between a fluctuating pressure curve related to a fluctuating pressure of the catenary and a catenary-following pressure curve related to a catenary-following pressure of the pantograph over time under the current manifestation, and rating the catenary-following ability of the pantograph under the current manifestation according to a result of the comparison.

Therein, the catenary-following ability assessing unit 120 comprises:
  a curve-acquiring module, for acquiring the fluctuating pressure curve of the catenary and the catenary-following pressure curve of the pantograph over time under the current manifestation;
  a data-collecting module, for setting a plurality of sampling time points, and performing data collection on both of the fluctuating pressure curve of the catenary and the catenary-following pressure curve of the pantograph under the current manifestation according to the sampling time points, so as to collect a fluctuating pressure value of the catenary and a catenary-following pressure value of the pantograph corresponding to each of the sampling time points under the current manifestation;
  a factor-calculating module, for using $$f = \frac{F_l - F_p}{F_l}$$

to calculate a catenary-following factor f formed by the fluctuating pressure and the catenary-following pressure at each of the sampling time points under the current manifestation, where $F_l$ and $F_p$ represent the fluctuating pressure value and the catenary-following pressure value corresponding to the same sampling time point under the same manifestation, respectively; and
  a performance-assessing module, for according to the fluctuating pressure value and the catenary-following pressure value corresponding to each of the sampling time points under the current manifestation in combination with the calculated catenary-following factor f related to each of the sampling time points under the current manifestation, rating the pantograph catenary-following ability corresponding to each of the sampling time points under the current manifestation.

Therein, the performance-assessing module comprises:
  a parameter acquiring sub-module, for under the current manifestation, acquiring the fluctuating pressure value $F_l$ and the catenary-following pressure value $F_p$ corresponding to each of the sampling time points, respectively, as well as the catenary-following factor f calculated from the two values;
  a first assessing sub-module, for if the catenary-following factor corresponding to a certain one of the sampling time points f<0 and the acquired catenary-following pressure value $F_p$>the acquired fluctuating pressure value $F_l$, determining that the catenary-following pressure value of the pantograph corresponding to the certain sampling time point is large and tends to accelerate wear of a pantograph pan of the pantograph;
  a second assessing sub-module, for if the catenary-following factor corresponding to a certain one of the sampling time points f=0 and the acquired catenary-following pressure value $F_p$=the acquired fluctuating pressure value $F_l$, determining that the catenary-following ability is optimal and matching of the pantograph-catenary system is optimal at the certain sampling time point;
  a third assessing sub-module, for if the catenary-following factor corresponding to a certain one of the sampling time points f>0 and the acquired catenary-following pressure value $F_p$<the acquired fluctuating pressure value $F_l$, determining that the catenary-following pressure value of the pantograph corresponding to the certain sampling time point is small and tends to incur separation and arcs between the pantograph and the catenary; and
  a fourth assessing sub-module, for if the catenary-following factor corresponding to a certain one of the sampling time points f<0 and the acquired catenary-following pressure value $F_p$ is greater than the acquired fluctuating pressure value $F_l$ by more than a predetermined threshold value, or if the catenary-following factor corresponding to a certain one of the sampling time points f>0 and the acquired catenary-following pressure value $F_p$ is smaller than the acquired fluctuating pressure value $F_l$ by more than a predetermined threshold value, determining that the catenary-following ability at that sampling time point is poor.

Therein, the pressure values on the catenary-following pressure curve of the pantograph are acquired by building up a dynamic equation of the pantograph, and the pressure values on the fluctuating pressure curve of the catenary are acquired by building up a dynamic equation of the catenary.

Therein, the pressure difference is determined by the catenary-following pressure of the pantograph, and the time delay is determined by a control delay of the pantograph, while the curve difference is determined by external interfering factors acting on the pantograph.

By implementing the embodiments of the present invention, the following benefits can be achieved.

The present invention uses catenary-following ability as a real-time indicator of sliding electrical contact of an electric locomotive pantograph-catenary system, and improves catenary-following ability of the pantograph by adjusting the catenary-following pressure and adapting to the fluctuating pressure of the contact wire in a real-time manner, so as to address the defects about low precision as seen in the existing assessment methods, and significantly reduce wear and arc erosion occurring in the pantograph-catenary sliding friction pair, thereby improving the pantograph-catenary system in terms of contact loss rate and arcing rate, optimizing the current collection stability and wear control during the sliding electrical contact of the pantograph-catenary system, and in turn extending the service life of the pantograph-catenary system.

It is to be noted that the units in the disclosed system as described with reference to the foregoing embodiment merely represent a non-limiting example derived from division of functional logics and may be implemented differently as long as the desired functions are provided. In addition, the denominations of the described functional units are intended to facilitate differentiation and form no limitations to the scope of the present invention.

People of ordinary skill in the art would appreciate that all or some part of the steps as described in the foregoing embodiments may be implemented using hardware, or may alternatively be implemented using a program that instructs relevant hardware. The program may be stored in a computer readable storage medium, and the storage medium may be a read-only storage, a magnetic disk, an optical disk, or the like.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A method for assessing sliding electrical contact performance of an electric locomotive pantograph-catenary system, comprising steps of:
   arranging a pantograph of the pantograph-catenary system to be in contact with to a catenary of the pantograph-catenary system to induce waves on a contact wire of the catenary, such that a contact pressure between the pantograph and the contact wire is variable by the vertical fluctuations induced by the waves to cast catenary-following ability of the pantograph to the catenary;
   determining a current manifestation of the catenary-following ability of the pantograph to the catenary of the pantograph-catenary system, wherein the current manifestation is one or more of a pressure difference, a time delay, and a curve difference; and
   performing comparison between a fluctuating pressure curve related to a fluctuating pressure of the catenary and a catenary-following pressure curve related to a catenary-following pressure of the pantograph over time under the current manifestation, and rating the catenary-following ability of the pantograph under the current manifestation according to a result of the comparison.

2. The method of claim 1, wherein the step of performing comparison between a fluctuating pressure curve related to a fluctuating pressure of the catenary and a catenary-following pressure curve related to a catenary-following pressure of the pantograph over time under the current manifestation, and rating the catenary-following ability of the pantograph under the current manifestation according to a result of the comparison comprises:
   acquiring the fluctuating pressure curve of the catenary and the catenary-following pressure curve of the pantograph over time under the current manifestation;
   setting a plurality of sampling time points, and performing data collection on both of the fluctuating pressure curve of the catenary and the catenary-following pressure curve of the pantograph under the current manifestation according to the sampling time points, so as to collect a fluctuating pressure value of the catenary and a catenary-following pressure value of the pantograph corresponding to each of the sampling time points under the current manifestation;
   using $$f = \frac{F_l - F_p}{F_l}$$

to calculate a catenary-following factor f formed by the fluctuating pressure and the catenary-following pressure at each of the sampling time points under the current manifestation, where $F_l$ and $F_p$ represent the fluctuating pressure value and the catenary-following pressure value corresponding to the same sampling time point under the same manifestation, respectively; and
   according to the fluctuating pressure value and the catenary-following pressure value corresponding to each of the sampling time points under the current manifestation in combination with the calculated catenary-following factor f related to each of the sampling time points under the current manifestation, rating the pantograph catenary-following ability corresponding to each of the sampling time points under the current manifestation.

3. The method of claim 2, wherein the step of according to the fluctuating pressure value and the catenary-following pressure value corresponding to each of the sampling time points under the current manifestation in combination with the calculated catenary-following factor f related to each of the sampling time points under the current manifestation, rating the pantograph catenary-following ability corresponding to each of the sampling time points under the current manifestation comprises:
   under the current manifestation, acquiring the fluctuating pressure value $F_l$ and the catenary-following pressure value $F_p$ corresponding to each of the sampling time points, respectively, as well as the catenary-following factor f calculated from the two values;
   if the catenary-following factor corresponding to a certain one of the sampling time points f<0 and the acquired catenary-following pressure value $F_p$>the acquired fluctuating pressure value $F_l$, determining that the catenary-following pressure value of the pantograph corresponding to the certain sampling time point is large and tends to accelerate wear of a pantograph pan of the pantograph;

if the catenary-following factor corresponding to a certain one of the sampling time points f=0 and the acquired catenary-following pressure value $F_p$=the acquired fluctuating pressure value $F_l$, determining that the catenary-following ability is optimal and matching of the pantograph-catenary system is optimal at the certain sampling time point;

if the catenary-following factor corresponding to a certain one of the sampling time points f>0 and the acquired catenary-following pressure value $F_p$<the acquired fluctuating pressure value $F_l$, determining that the catenary-following pressure value of the pantograph corresponding to the certain sampling time point is small and tends to incur separation and arcs between the pantograph and the catenary; and if the catenary-following factor corresponding to a certain one of the sampling time points f<0 and the acquired catenary-following pressure value $F_p$ is greater than the acquired fluctuating pressure value $F_l$ by more than a predetermined threshold value, or if the catenary-following factor corresponding to a certain one of the sampling time points f>0 and the acquired catenary-following pressure value $F_p$ is smaller than the acquired fluctuating pressure value $F_l$ by more than a predetermined threshold value, determining that the catenary-following ability at that sampling time point is poor.

4. The method of claim 2, wherein the pressure values on the catenary-following pressure curve of the pantograph are acquired by building up a dynamic equation of the pantograph, and the pressure values on the fluctuating pressure curve of the catenary are acquired by building up a dynamic equation of the catenary.

5. The method of claim 1, wherein the pressure difference is determined by the catenary-following pressure of the pantograph, and the time delay is determined by a control delay of the pantograph, while the curve difference is determined by external interfering factors acting on the pantograph.

6. A system for assessing sliding electrical contact performance of an electric locomotive pantograph-catenary system, wherein a pantograph of the pantograph-catenary system is arranged to be in contact with to a catenary of the pantograph-catenary system to induce waves on a contact wire of the catenary, such that a contact pressure between the pantograph and the contact wire is variable by the vertical fluctuations induced by the waves to induce catenary-following ability of the pantograph to the catenary, the system comprising:

a catenary-following ability manifestation determining unit, for determining a current manifestation of the catenary-following ability of the pantograph to the catenary of the pantograph-catenary system, wherein the current manifestation is one or more of a pressure difference, a time delay, and a curve difference; and a catenary-following ability assessing unit, for performing comparison between a fluctuating pressure curve related to a fluctuating pressure of the catenary and a catenary-following pressure curve related to a catenary-following pressure of the pantograph over time under the current manifestation, and further rating the catenary-following ability of the pantograph under the current manifestation according to a result of the comparison.

7. The system of claim 6, wherein the catenary-following ability assessing unit comprises:

a curve-acquiring module, for acquiring the fluctuating pressure curve of the catenary and the catenary-following pressure curve of the pantograph over time under the current manifestation;

a data-collecting module, for setting a plurality of sampling time points, and performing data collection on both of the fluctuating pressure curve of the catenary and the catenary-following pressure curve of the pantograph under the current manifestation according to the sampling time points, so as to collect a fluctuating pressure value of the catenary and a catenary-following pressure value of the pantograph corresponding to each of the sampling time points under the current manifestation;

a factor-calculating module, for using $$f = \frac{F_l - F_p}{F_l}$$

to calculate a catenary-following factor f formed by the fluctuating pressure and the catenary-following pressure at each of the sampling time points under the current manifestation, where $F_l$ and $F_p$ represent the fluctuating pressure value and the catenary-following pressure value corresponding to the same sampling time point under the same manifestation, respectively; and a performance-assessing module, for according to the fluctuating pressure value and the catenary-following pressure value corresponding to each of the sampling time points under the current manifestation in combination with the calculated catenary-following factor f related to each of the sampling time points under the current manifestation, rating the pantograph catenary-following ability corresponding to each of the sampling time points under the current manifestation.

8. The system of claim 7, wherein the performance-assessing module comprises:

a parameter acquiring sub-module, for under the current manifestation, acquiring the fluctuating pressure value $F_l$ and the catenary-following pressure value $F_p$ corresponding to each of the sampling time points, respectively, as well as the catenary-following factor f calculated from the two values;

a first assessing sub-module, for if the catenary-following factor corresponding to a certain one of the sampling time points f<0 and the acquired catenary-following pressure value $F_p$>the acquired fluctuating pressure value $F_l$, determining that the catenary-following pressure value of the pantograph corresponding to the certain sampling time point is large and tends to accelerate wear of a pantograph pan of the pantograph;

a second assessing sub-module, for if the catenary-following factor corresponding to a certain one of the sampling time points f=0 and the acquired catenary-following pressure value $F_p$=the acquired fluctuating pressure value $F_l$, determining that the catenary-following ability is optimal and matching of the pantograph-catenary system is optimal at the certain sampling time point;

a third assessing sub-module, for if the catenary-following factor corresponding to a certain one of the sampling time points f>0 and the acquired catenary-following pressure value $F_p$<the acquired fluctuating pressure value $F_l$, determining that the catenary-following pressure value of the pantograph corresponding to the certain sampling time point is small and tends to incur separation and arcs between the pantograph and the catenary; and a fourth assessing sub-module, for if the catenary-following factor corresponding to a certain one of the sampling time points f<0 and the acquired catenary-following pressure value $F_p$ is greater than the acquired fluctuating pressure value $F_l$ by more than a predetermined threshold value, or if the catenary-following factor corresponding to a certain one of the sampling time points f>0 and the acquired catenary-following pressure value $F_p$ is smaller than the acquired fluctuating pressure value $F_l$ by more than a predetermined threshold value, determining that the catenary-following ability at that sampling time point is poor.

9. The system of claim 7, wherein the pressure values on the catenary-following pressure curve of the pantograph are acquired by building up a dynamic equation of the pantograph, and the pressure values on the fluctuating pressure curve of the catenary are acquired by building up a dynamic equation of the catenary.

10. The system of claim 6, wherein the pressure difference is determined by the catenary-following pressure of the pantograph, and the time delay is determined by a control delay of the pantograph, while the curve difference is determined by external interfering factors acting on the pantograph.

* * * * *